United States Patent [19]

Frimet et al.

[11] 4,409,628

[45] Oct. 11, 1983

[54] TAPE TRANSPORT SPEED CONTROL USING A PLAYBACK DATA DERIVED CLOCK SIGNAL

[75] Inventors: Stanley H. Frimet, Englewood; Leighton A. Meeks, Littleton, both of Colo.

[73] Assignee: Honeywell, Inc., Minneapolis, Minn.

[21] Appl. No.: 321,365

[22] Filed: Nov. 16, 1981

[51] Int. Cl.³ .............................................. G11B 15/52
[52] U.S. Cl. ................................................... 360/73
[58] Field of Search ......................................... 360/73

[56] References Cited

U.S. PATENT DOCUMENTS 4,296,446  10/1981  Zorbalas ........................... 360/73
4,348,699   9/1982  Tsuchiya et al. ................... 360/73

FOREIGN PATENT DOCUMENTS 2506481  8/1976  Fed. Rep. of Germany ........ 360/73

Primary Examiner—George G. Stellar
Attorney, Agent, or Firm—Lockwood D. Burton; Mitchell J. Halista

[57] ABSTRACT

A tape transport speed control uses a synthesized clock signal primarily derived from playback data signals in a preselected primary data track. Data signal drop-out in the primary data track used to produce the synthesized clock signal is monitored by a digital logic circuitry which is effective to borrow secondary derived clock signals from an adjacent data track on the same tape. The borrowed secondary synthesized clock signals are used during the drop-out interval on the primary data. The handover of the borrowed clock signals from the adjacent track and the return to the clock signals derived from the primary track is performed automatically by a sensing of the start and end of the drop-out.

14 Claims, 4 Drawing Figures

TAPE TRANSPORT SPEED CONTROL USING A PLAYBACK DATA DERIVED CLOCK SIGNAL

BACKGROUND OF THE INVENTION

1. Field of the Invention

The present invention relates to tape speed controls for magnetic tape transports. More specifically, the present invention is directed to a tape speed control using clock signals synthesized from a playback data train.

2. Description of the Prior Art

In digital magnetic recording apparatus, the input data is recorded as flux changes on a magnetic tape medium. In order to faithfully reproduce the recorded digital data, the instantaneous tape speed during playback must be equal to the tape speed used during recording. A speed control servo system is used to control the tape speed during playback utilizing a feedback signal from the tape which is compared with a fixed frequency reference signal to generate an error signal for correcting the tape speed by controlling the tape drive. In multi-channel recording on a plurality of recording tracks on a magnetic tape, the feedback signal is recorded as a reference frequency on one channel, a so-called clock track, while data is being recorded on the other channels. During playback a separate magnetic playback head is used to reproduce the reference frequency from the clock track for use by the speed control system during playback. Such a control system requires the dedication of a recording channel to record the reference frequency or clock signal. In a high density digital recording apparatus where a high packing density is necessary in order to record a large amount of input data supplied at a high rate, data is usually recorded simultaneously on a number of parallel channels on the magnetic tape, and the clock track occupies a channel that could advantageously be used as a data track or channel. Accordingly, it would be advantageous to utilize a tape speed control system that was capable of synthesizing a clock signal from the reproduced data without having to dedicate a recording channel for recording a clock signal.

SUMMARY OF THE INVENTION

An object of the present invention is to provide an improved recording tape speed control system utilizing means for synthesizing a clock signal used in the speed control system from reproduced recorded digital data.

Another object of the present invention is to provide an improved tape speed control system utilizing a synthesized clock signal derived from reproduced recorded digital data which avoiding a loss of synthesized clock signals during a drop-out of the data used to produce the synthesized clock signal.

In accomplishing these and other objects, there has been provided, in accordance with the present invention, a tape speed control system for controlling the speed of a record tape during a playback operation using a synthesized clock signal derived from playback data track. Data signal dropout in the primary track is compensated by a handover of a synthesized clock signal from an adjacent secondary data track on the recording tape during the interval of the drop-out condition on the primary track. The handover operation is automatically interrupted when the dropout condition on the primary track is terminated. An extended simultaneous dropout on the primary and secondary track is arranged to produce a transfer of the speed control until the dropout condition is terminated to an open loop constant speed operating mode at the last data locked speed.

BRIEF DESCRIPTION OF THE DRAWINGS

A better understanding of the present invention may be had from the following detailed description when read in connection with the accompanying drawings in which.

DESCRIPTION OF THE PREFERRED EMBODIMENT

Detailed Description

Figure 1:
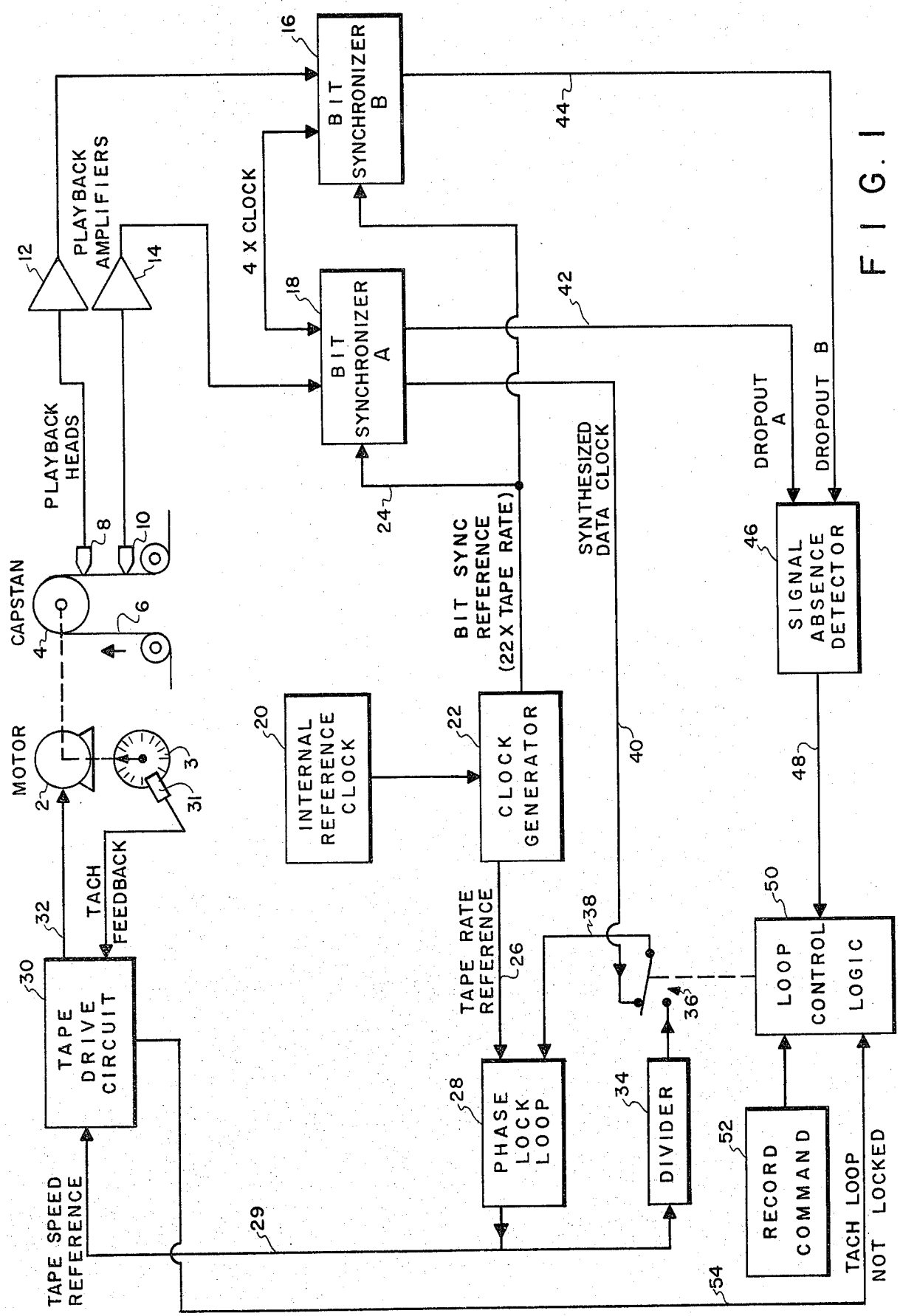
FIG. 1 is a schematic block diagram representation of a magnetic recording playback speed control system embodying an example of the present invention.

Referring to FIG. 1 in more detail, there is shown a schematic block diagram representation of an example a magnetic tape playback speed system embodying the present invention. The playback speed control system includes a capstan motor 2 which is arranged to concurrently drive a tone wheel 3 and a capstan 4. A magnetic tape 6 is driven by the capstan 4 past magnetic playback transducers 8, 10. While the magnetic playback transducers have been illustrated as a pair of transducers, it will be appreciated that the transducers are preferably part of a multiple transducer head with each transducer element being positioned to playback the signals on a corresponding one of a plurality of recording tracks on the recording tape 6. The output signal from each of the playback heads 8, 10 is applied to a corresponding playback amplifier or signal conditioning circuit 12, 14. The signal conditioning circuits 12, 14 may include such well-known features as preamplification, linearization, amplitude and phase equalization. Each of the playback amplifiers 12, 14 has an output which is connected to a respective bit synchronizer 16, 18. The bit synchronizers 16, 18 include means for synthesizing a data bit rate clock signal from the data signal in a preselected individual data track. The synthesized signal is then used to synchronize the data bits of the reproduced recording tracks and is applied to the speed control circuitry, as discussed hereinafter. The data signals obtained from the bit synchronizers 16, 18 are transmitted to subsequent data manipulation means (not shown) where the data signals are subjected to whatever manipulations are required by the organizational structure of the system and ultimately supplied to a utilization means which may be a printout device or a display device such as a cathode ray tube for displaying the information derived from the reproduced data.

An internal reference clock 20 is used to supply a reference clock drive signal to a clock signal generator 22. One output of the clock signal generator is a bit sync reference signal which is applied to the bit synchronizers 16, 18. The clock generator 22 is also arranged to provide a tape rate reference signal, i.e., the demanded data rate from the tape 6, on an output line 26 which is applied as a first input to a phase lock loop 28. The bit sync reference signal is arranged to have a frequency which is twenty two times the selected frequency of the tape rate reference signal. The output of the phase lock loop 28 is applied over line 29 to a tape drive circuit 30 as a tape speed reference signal. The tape drive circuit 30 is a conventional servo control using the tape speed reference signal and a tach feedback signal from a transducer 31 sensing the tone wheel 3 to produce a motor control signal for maintaining a predetermined relationship between the input signals to the tape drive circuit 30. The output of the tape drive circuit 30 is applied over output line 32 to control the speed of the capstan motor 2.

The output of the phase lock loop 28 is also applied to a frequency divider 34. The output of the frequency divider 34 is applied to one fixed contact of a double pole, single throw switch 36. The movable contact of the switch 36 is connected by a line 38 to a second input of the phase lock loop 28. The other fixed contact of the switch 36 is connected by line 40 to one of the bit synchronizers, e.g., bit synchronizer 18, to supply a synthesized data clock signal to the switch 36. Thus, in the illustrated position of the switch 36, the phase lock loop 28 is arranged to compare the synthesized data clock with the tape rate reference signal generated by the clock generator 22. The phase lock loop 28 continually adjusts its output frequency to correct the speed of the tape 6 to keep the synthesized data clock signal phase and frequency locked to the frequency of the tape rate reference signal. Since the synthesized data clock is derived from playback data, the tape transport speed control is locked to the reproduced data frequency, as more fully described hereinafter.

The synchronizers 16, 18 are also arranged to detect dropouts in the data reproduced from the corresponding recording tracks of the magnetic tape 6. A dropout condition occurs when the signal amplitude of the reproduced data falls below operating, i.e., viable, signal thresholds. During this time, the synthesized data clock from the bit synchronizer 18 may no longer be a true representation of the data rate, i.e., tape speed. As hereinafter discussed, during signal dropouts on the preselected record channel supplying the bit synchronizer 18, the bit synchronizer 16 supplied by an adjacent record channel sends or "handsover" a clock signal having a frequency four times the synthesized data clock signal to the bit synchronizer 18 to lock the data clock signal to the data on the adjacent channel. This borrowing of the clock signal from the adjacent track is automatically terminated when the dropout condition ceases. Each of the bit synchronizers 16, 18 also provides a dropout signal to signal the existence of a dropout condition on a respective record track on dropout signal lines 42, 44, respectively. A signal absence detector 46 is arranged to detect the dropout signals from the two channels and to indicate a simultaneous dropout, i.e., lack of data signals from both channels. If this dropout signal condition on both channels persists for a specified duration, then a loop control logic controlled by the signal absence detector output on line 48 operates the switch 36 to switch the movable contact of the switch 36 to the other fixed contact connected to the divider 34. In this condition, the system is in an "open loop" configuration whereby the speed of the tape is not controlled by the synthesized data clock. Specifically, the output of the phase lock loop 28 is fed back through the divider 34 and the switch 36 to form the second input to the phase lock loop 28 to retain the tape speed at a constant value determined by the tape rate reference signal.

Two other conditions resulting in an "open loop" operation are during "record" operation of the system for recording data signals on the magnetic tape 6 and during an unlocked state of the tape drive circuit 30 as provided during acceleration and decceleration intervals of the magnetic tape 6. A record command circuit 52 which may be manually operated from a control panel on the tape transport is arranged to provide an override of the loop control logic 50 during the "record" mode to switch the switch 36 to the "open loop" type of operation, while an output from the tape drive circuit 30 over a line 54 provides a signal representative of an unlocked tach loop which is also effective to control the loop control logic to switch the switch 36 into the "open loop" operation. In summary, the recorded digital data on preselected channels is sensed by reproduce, or playback, heads 8, 10, amplified by the playback amplifiers 12, 14 and applied to the bit synchronizers 16, 18. The bit synchronizers 16, 18 reconstruct a data clock from the recorded data and the synthesized data clock is applied to control the tape speed by means of the phase lock loop 28 and tape drive circuit 30. Dropouts of the data on the record channel sensed by the heads 8, 10 are compensated by an automatic borrowing of a synthesized clock signal from an adjacent data channel. The frequency of the synthesized clock is proportional to the actual tape velocity. Thus, the tape speed is controlled during playback without having to dedicate a record channel on the magnetic tape 6 to supply a clock signal as a reference frequency to the playback speed control circuit 30.

Figure 2:
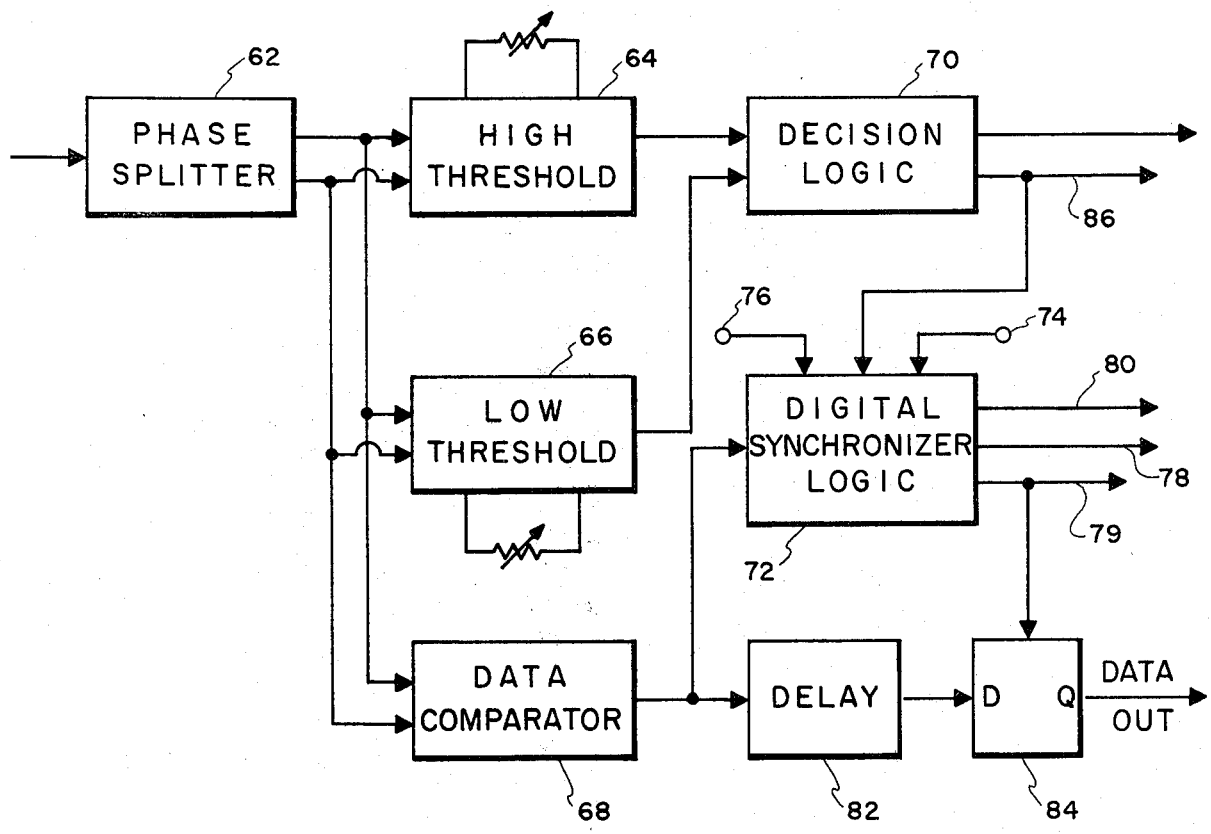
FIG. 2 is a schematic block diagram of the bit synchronizer circuitry used in FIG. 1.

In FIG. 2 there is shown a block diagram of each of the bit synchronizers 16 and 18 illustrated in FIG. 1. For example, the case of the bit synchronizer 18, the data from the signal playback amplifier 14 is applied as an input signal to a phase splitter 62. The two output signals from the phase splitter 62 are applied to corresponding input terminals of a high threshold comparator 64 and a low threshold comparator 66. The high and low threshold comparator 64 and 66 are arranged so that during normal input signals, each of the comparators 64, 66 provides an output signal at each zero crossing of the input signals. Similarly the output signals from the phase splitter 62 are applied to the input terminals of a data comparator 68. This comparator also provides output pulses at each zero crossing of the input signals applied thereto. The output signal from the high and low threshold comparators 64 and 66, respectively, are applied as input signals to a decision logic circuit 70. The decision logic circuit 70 is operative in response to the input signals from the two threshold comparators 64, 66 to determine when a drop-out in the input signal has occurred and when the input signal has been restored to normal, i.e., the drop-out has ceased. A drop-out is deemed to have occurred when the magnitude of the playback signal obtained from the tape has dropped below a predetermined level, without regard to the reason for the drop. The output of the decision logic circuit 70 is applied to a digital synchronizer logic circuit 72. The digital synchronizer logic circuit 72 also receives an input signal from the output of the data comparator 68. A reference signal source represented by the clock generator 22 shown in FIG. 1 is connected to input line 74 to supply source a reference digital pulse signal to the synchronizer logic 72. In a preferred embodiment of the present invention, that reference signal source had a frequency which was substantially twenty two times the nominal data bit rate. A further input signal to the digital synchronizer logic circuit 72 is a clock signal applied to an input line 76 and derived from an adjacent channel on the same tape 6 as the primary signal under consideration. Again, in a preferred embodiment, the clock signal applied to the input terminal 76 has a frequency which is substantially four times the nominal data bit rate.

The digital synchronizer logic circuit 72 manipulates the reference signal applied to the input terminal 74 in conjunction with the data signal applied from the data comparator 68 to produce a synthesized data bit rate clock at an output terminal 78. A complement of that signal, which is herein referred to as a 180° clock signal, is also produced at an output terminal 79. The digital synchronizer logic circuit 72 also provides an output signal which corresponds to a handover clock signal at an output terminal 80. The handover clock signal, in the preferred embodiment, has a frequency which is substantially four times the nominal data bit rate and is synchronized with the recorded data signals. The output of the data comparator 68 is also applied as an input signal to a delay circuit 82. The delayed output of the delay circuit 82 is applied to the D input of a flip-flop 84. The delay circuit 82 delays the data output pulses from the data comparator 68 to accommodate the time delay encountered in the digital synchronizer logic 72. The data pulses from the delay circuit 82 are reclocked by the clock signals from the terminal 79 connected to the clock input of the flip-flop 84. The data output signal from the Q output terminal of the flip-flop 84 are now synchronized with the synthesized clock signal at the output terminal 79.

In the event that the decision logic circuit 70 determines that a high threshold drop-out has occurred, there will be provided an output signal, at an output terminal 86, which signal is applied as an input signal to the digital synchronizer logic circuit 72. That signal applied to the digital synchronizer logic circuit 72, causes the signal at the output terminal 80, i.e., the handover clock signal, to be inhibited. At the same time, the handover clock signal applied to the input terminal 76 of the digital synchronizer logic circuit 72 from an adjacent signal channel on the tape, is accepted by the digital synchronizer logic circuit 72 to be used for generating a synthesized data signal. That synthesized data signal is then manipulated in cooperation with the reference signal 74 to produce the synchronized, synthesized bit rate clock signal at the output terminal 78 of the digital synchronizer logic circuit 72.

During the handover interval, the data input from the comparator 68 is inhibited at the input of the digital synchronizer logic circuit 72. After a predetermined interval following a termination of the drop-out condition, the decision logic circuit 70 will remove the inhibit signal from the terminal 86, and the digital synchronizer logic circuit 72 will return to its normal operation for comparing the internal data signal from the comparator 68 with the reference signal 62 to produce both the output signal on the terminals 78, 79, and the handover clock signal on the output terminal 80.

Figure 3:
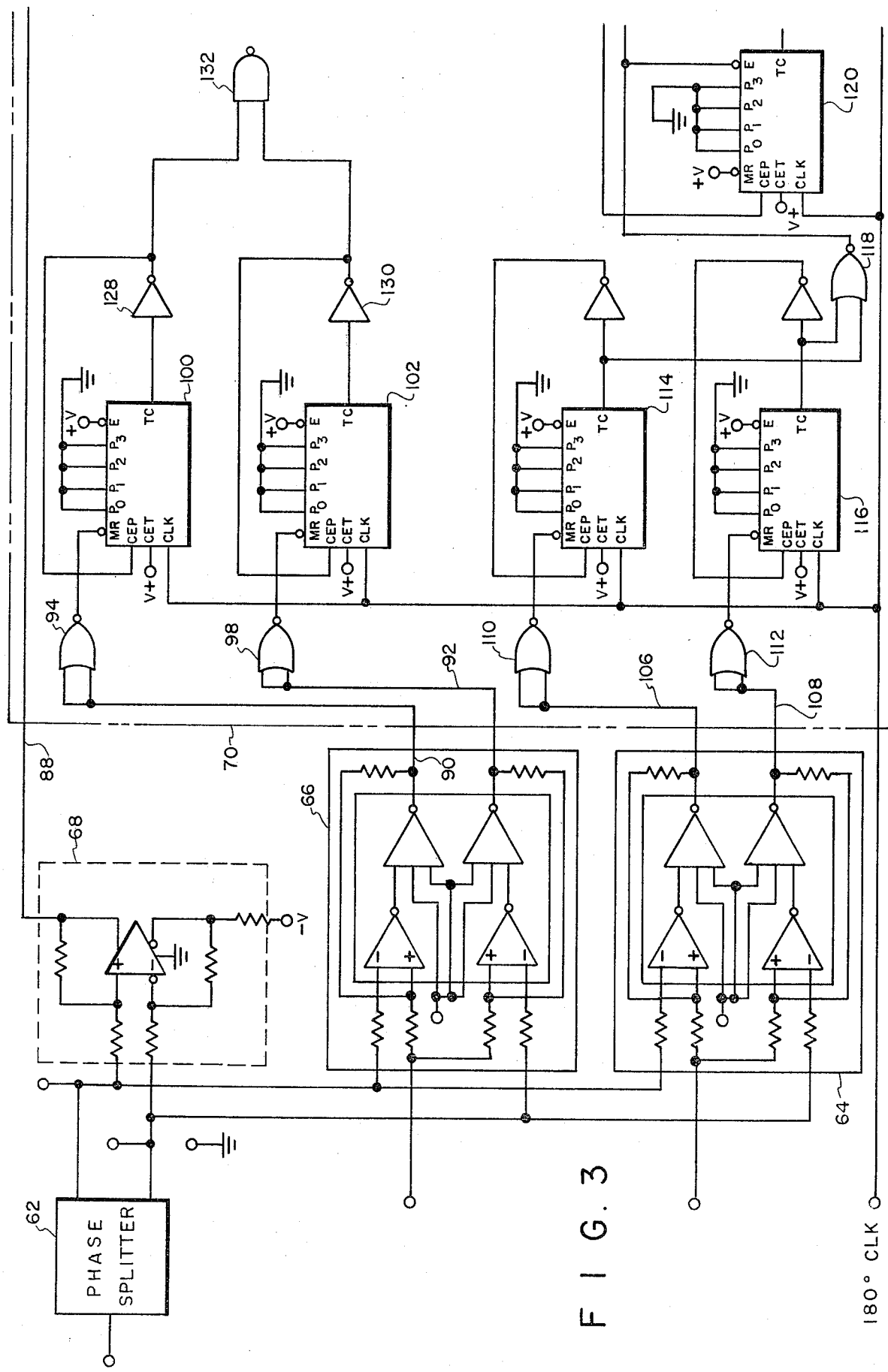
FIG. 3 is a detailed schematic diagram of a portion of the circuitry illustrated in block diagram form in FIG. 2.
Figure 4:
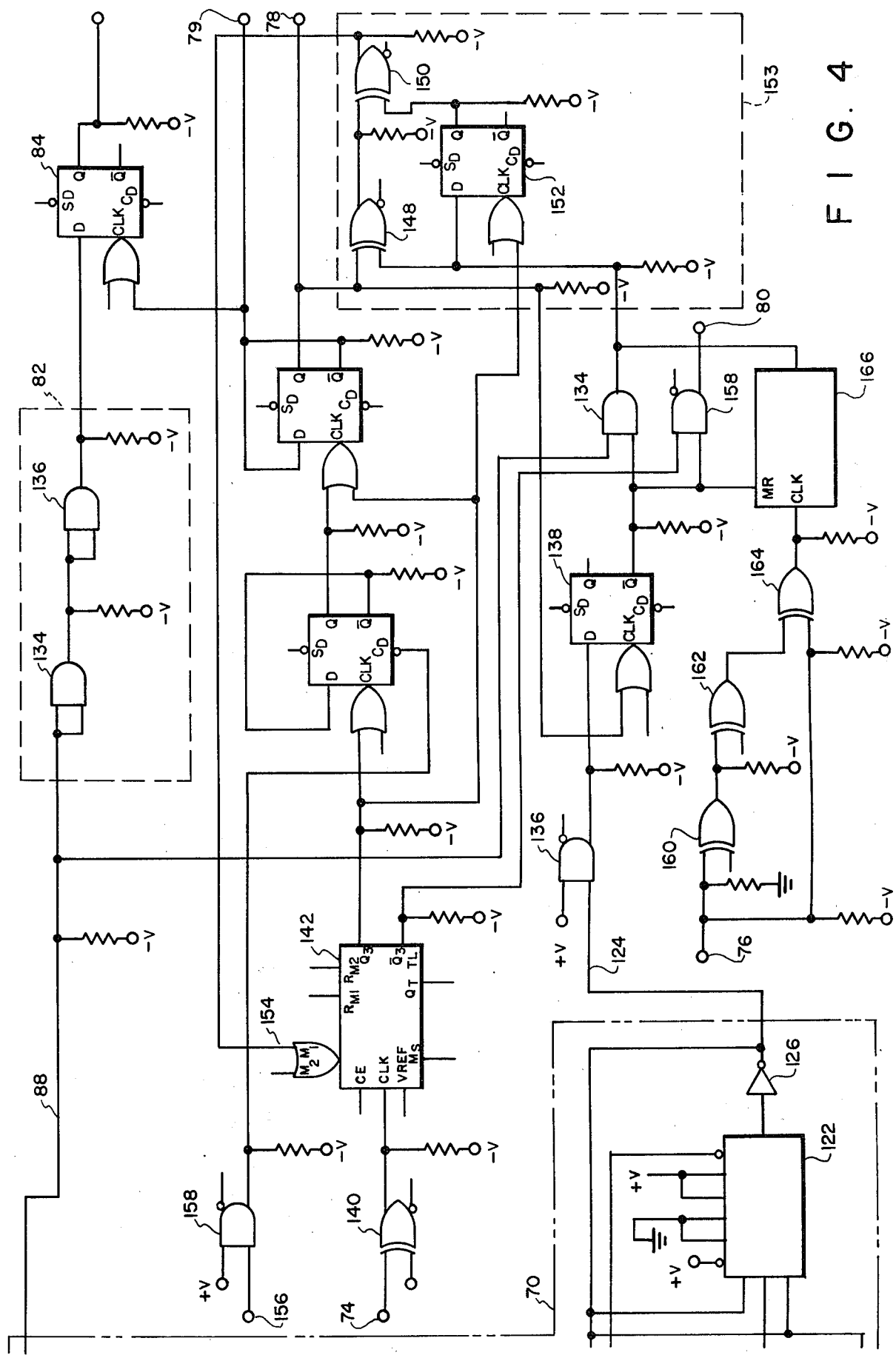
FIG. 4 is a detailed schematic diagram of another portion of the circuitry illustrated in block diagram form in FIG. 2.

In FIGS. 3 and 4, there is shown, in substantially greater detail, an implementation of the circuit elements illustrated in block form in FIG. 2.

In FIG. 3, the phase splitter 62, the high threshold comparator 64, and the low threshold comparator 66 which are conventional circuits are again represented in block diagram form. The outputs of the phase splitter 62 are applied as input signals to the data comparator 68. The data comparator 68 may be a conventional comparator such as a commercially available comparator identified as AM685D. The output of the comparator 68 on the lead 88 comprises, substantially, a reconstruction of the data pulses input to the phase splitter 62, but exhibiting sharper transition details. Each of the two threshold comparators 64 and 66, which may be commercially available units identified at NE521 modules, comprise dual differential comparators in which the negative going pulse of each of the two phase signals is compared with a negative voltage reference signal. In an exemplary embodiment of the present invention, the reference voltage applied to the reference input terminal of the high threshold comparator was such as to detect a diminution of the input signal 12 db below nominal. Similarly the reference voltage level applied to the reference input of the low threshold comparator 66 was such as to detect a diminution of the data signal 20 db below nominal. The output signals from the low threshold detector 66 appear on the leads 90 and 92, respectively, and together provide an output pulse for each zero crossing of the phase-split data signals as compared with the reference signal applied thereto. The signals appearing on lead 90 are applied to both input terminals of a NOR gate 94. The signals appearing on the lead 92 are applied to both input terminals of a NOR gate 98. The output of the NOR gate 94 is connected to the CLEAR input terminal of a counter 100. Similarly, the output terminal of the NOR gate 98 is connected to the CLEAR input terminal of a counter 102.

The output signals from the high threshold comparator 64 appear on the leads 106 and 108, respectively, and together these two leads carry output pulses for each zero crossing of the phase-split data signals as compared with the high level threshold reference signal. The signals on the lead 106 are applied to both input terminals of a NOR gate 110 while the signals appearing on the lead 108 are applied to both input terminals of a NOR gate 112. The output terminal of the NOR gate 110 is connected to the CLEAR input terminal of a counter 114 while the output terminal of the NOR gate 112 is connected to the CLEAR input terminal of a counter 116.

The counters 100, 102, 114, and 116 are maintained in their CLEAR output condition so long as the signals from the phase splitter exceed the level of the reference signals, respectively. So long as the output pulses appear on the leads 90, 92, 106, and 108, respectively, a logical low signal will be applied to the CLEAR input terminals of each of the counters 100, 102, 114, and 116, respectively. If, however, the data signals from the phase splitter 62 are of a magnitude insufficient to exceed the reference signal applied to the input of either or both of the threshold comparators 64, 66, there will be no output signals on the leads 90, 92, 106, and 108. The absence of such signals removes the reset or clear signals from the counter 100, 102, 114, and 116. These counters are then clocked by a clock signal which, as will be described in more detail hereinafter, is timed to occur at the midpoint of the data derived pulses.

In the absence of a clear or reset signal on the counters, the clock signals applied to the input terminal of each of the several counters 100, 102, 114, 116 cause those counters to begin to count. In the aforementioned embodiment, each of the counters 100, 102, 114, and 116 were chosen to be sixteen bit counters. These counters provide a signal delay to prevent the system from generating spurious drop-out signals due to noise or very short flaws or multiple successive flaws in the tape record. Thus, in order to generate a drop-out signal the flaw must be at least fifteen bits in length. When a flaw occurs wherein the data signals do not exceed the magnitude of the reference signal applied to the input signals of the high threshold comparator 64, the counters 114 and 116 begin to count, and the fifteenth count on each of the two counters 114, 116 appear at an output terminal, respectively, of the two counters 114, 116. That output signal is applied as input signals to the first and second input terminals of a NOR gate 118. The output of the NOR gate 118 is connected to the ENABLE, or LOAD, terminals of a first and second counter 120 and 122. The two counters 120 and 122 are programmable counters which may be of the type such as commercially available 74LS161 type integrated circuit modules. The four input terminals of the counter 120 are connected to ground as are the first two input terminals of the counter 122. The last two input terminals of the counter 122 are connected to a pull-up voltage source +V. So long as the data signals from the phase splitter 52 are of normal magnitude, the output signal of the NOR gate 118 will be a logical high which will prevent the loading of signals into the counters 120 and 122 from the programmed input terminals. Under those conditions, the output terminal of the counter 122 will be a logical high, indicating that the input signals are within the acceptable range of magnitude.

On the other hand, whenever the data signals from the phase splitter 62 are of a magnitude which is less than the magnitude of the threshold reference signal applied to the input of the high threshold comparator 64, the output signal from the NOR gate 118 will be a logical low. That logical low when applied to the ENABLE or LOAD input terminals of the counters 120 and 122 allow the logical ones appearing at the input terminal of the third and fourth inputs of the counter 122 to be loaded into the corresponding positions in the counter. The two counters 120 and 122 are clocked by the same clock signal as was used to clock the counters 100, 102, 114, and 116. The logical low applied to the ENABLE terminal of the counter 122 causes that output terminal to be locked at a logical low causes a logical high output signal to appear at the output terminal of an inverter 126 and on the lead 124. The logical low at the output terminal of the counter 122 is applied through the inverter 126 and back to an input CONTROL terminal on each of the counters 120 and 122 inhibiting those counters from counting.

The logical high signal on the output lead 124, as will be seen in connection with the discussion of FIG. 4 comprises a "handover" signal for the digital synchronizer logic circuit 72. That logical high on the lead 124 will continue so long as the flaw or drop-out continues on the record track under consideration. Again, in order to avoid a relatively rapid transfer back and forth between the logical high and logical low on the lead 124, once the magnitude on the signals supplied from the phase splitter have been restored to nominal value, the outputs of the NOR gate 118 returns to a logical high, applied to the LOAD or ENABLE terminals of the counters 120 and 122. This enables the counters 120 and 122 to begin counting. In the exemplary embodiment, the two counters are cascaded and have been arranged to have an output signal change after a count of sixty-three clock cycles. The sixty-third clock cycle will then cause the output signal on the lead 124 to change to a logical low.

In a similar manner when the data signals from the phase splitter 62 are compared with the reference signal applied to the input of the low threshold comparator 66, if those data signals are of a magnitude greater than the magnitude of the reference signal, output pulses will appear on the leads 90 and 92 and are applied to the input terminals of the NOR gate 94, 96, and 98. So long as these pulses occur, the counters 100 and 102 are held at a cleared condition with a logical low output signal appearing at the output signal of each of the counters 100 and 102. The logical low signals at the outputs at the two counters 100 and 102, are, respectively, inverted by a pair of inverters 128 and 120 and are applied to the input of a NAND gate 132. The output of the NAND gate 132 is applied to subsequent circuitry to signify that the signal from the phase splitter 62, and accordingly the signal derived from the tape itself, is below the level of the lower threshold and may be used to key the system to corrective action relative to the low signals.

In FIG. 4, the reconstructed data signals on the lead 88, obtained from the output of the data comparator 68, in FIG. 3, are applied to the input of a delay network 82 which, in the preferred embodiment, comprises a cascaded pair of AND gates 134 and 136. The output of the AND gate 136 is applied to the D input of a flip-flop 84. The Q output data out of the flip-flop 84 comprises the re-gated or synchronized data signals. The clocking signals for resynchronizing the data signals at the flip-flop 84 are derived from the digital synchronizer logic circuitry 72 as will be described hereinbelow. The data signals on the lead 88, in addition to being supplied to the delay unit 82, are applied as an input signal to an AND gate 134. The drop-out handover signal on the lead 124, from FIG. 3, is applied as an input signal to a buffer gate 136. The output of that buffer gate 136 is applied as an input signal to the D input terminal of a flip-flop 138. The signal on the $\overline{Q}$ output terminal of the flip-flop 138 is applied as input signal to the other input terminal of the AND gate 134.

In the discussion in connection with FIG. 2, it was indicated that a reference clock signal, which in the exemplary embodiment was twenty-two times the frequency of the data bit rate was applied as one input signal to the digital synchronizer logic circuit 72. That signal, generated by the clock generator 22 is applied as an input signal on a lead 74 to an input terminal of a buffer gate 140. The output of the buffer gate 140 is applied as an input signal to the clock input terminal of a divider 142. The divider 142 is a programmable divider and may be of the type which is commercially available as a Fairchild 11C91 module. In the examplary embodiment of the present invention that divider is arranged such that depending upon an applied control signal it will divide the reference signal by either a factor of five or a factor of six. The output of the divider 142 at the Q output terminal is, in the exemplary embodiment, approximately four times the nominal data bit rate. That output signal is applied as an input signal to the clock input terminal of a divide-by-two flip-flop 144. Similarly, the Q output of the flip-flop 144 is applied to the clock input terminal of a second divide-by-two flip-flop 146. The output signal from the Q output terminal of the flip-flop 146 is a clock signal which is approximately equal to the nominal data bit rate of the input data signals. This signal, it may be seen, has been synthesized from the data bit signals on the recorded tape and not from a clock signal track recorded thereon. This synthesized clock signal is applied on lead 40 to switch 36 as shown in FIG. 1.

The synthesized clock signal from the Q output terminal of the flip-flop 146 is also applied as one input to an EXCLUSIVE-OR gate 148 the output of which is connected to one input terminal of a second EXCLUSIVE-OR gate 150. The output clock signal from the Q output of the flip-flop 146 is also applied to the clock input terminal of the flip-flop 138. So long as the input signal to the D input terminal of the flip-flop 138 remains low, the $\overline{Q}$ output of the flip-flop 138 remains high enabling the gate 134. Thus, each of the data pulses from the lead 88 are transmitted through the gate 134 to the second input terminal of the NOR gate 148. The same data pulse signals are also applied to the D input terminal of a flip-flop 152. The Q output of the divider 142, which is approximately four-times the frequency of the nominal data bit rate, is applied as a clock input signal to the flip-flop 152. The Q output of the flip-flop 152 is applied to the other input terminal of the NOR gate 150. The combination of the NOR gates 148 and 150 and the flip-flop 152 comprise a comparator 153 for comparing the timing of the data pulses from the lead 88 through the gate 134 and the synthesized clock pulses from the $\overline{Q}$ outputs of the flip-flop 146.

It will be remembered that the divider 142 was programmable to either divide by five or to divide by six, depending upon the signal applied to the CONTROL input terminal 154 thereof. When the data bits from the gate 134 arrive at the comparator 153 early with respect to the synthesized clock bits from the gate 146, a logical high is produced at the CONTROL input terminal 154 of the divider 142 causing a division by five, thereby slightly speeding up the count rate of the synthesized data bit rate clock signal. On the other hand, if the synthesized clock signals arrive at the comparator 153 early with respect to the data bit from the gate 134, the comparator 153 will produce a logical low at the CONTROL input terminal 154 at the divider 142 causing that divider to divide the input signal by six, thereby slightly lowering the frequency of the synthesized clock signal. In this manner, the synthesized clock signal derived from the data train is maintained in close synchronization with the data bit rate of those signals.

Mention was made previously of a 180° clock signal, that clock signal was identified as a 180° clock signal because it is the complement of the synthesized clock signal appearing on the Q output of the flip-flop 146. The 180° clock signal is that output signal which appears at the $\overline{Q}$ output of the flip-flop 146. That signal is connected to the clock input terminal of the flip-flp 84 which reclocks or resynchronizes the data bit signals applied to the input line 88 and is timed to coincide with the maxima of the data bit signals rather than with an edge of the data bit signals which could possibly produce an ambiguity. Thus the data output signals are reclocked and synchronized with the synthesized clock signals on the lead 78.

The synthesized clock signals on the output lead 78 have been herein identified as having a frequency which is substantially equal to the data bit rate of the input data signals. That statement is true for one type of input data signals. There are two basic protocols in recording digital data on magnetic tape. In one of those protocols the individual data bits are recorded as pulses with each pulse returning to zero before the next pulse occurs. This is a so called return-to-zero type of recording. In the other main protocol, a so called non-return-to-zero technique is employed in which each pulse occupies the full data pulse width. If, in the non-return-to-zero technique, the data includes a plurality of successive logical ones, the first of those ones will cause the signal to go to a logical high on the tape staying at a high level without returning to zero until the last of the ones has been recorded. In the heretofore described method of synthesizing the clock signals from the data signals, the synthesized clock signals are of the same frequency as the data bit rate for the return-to-zero type of data input signals. Such a clock signal is appropriate for the subsequent clocking and timing of the return-to-zero type signals in the subsequent data processing apparatus. Such clock signals would not be appropriate for the non-return-to-zero type signals.

In order to accommodate the non-return-to-zero signals, a signal is generated, for example, by a setup switch at the panel of the tape apparatus, to indicate the type of signal being transduced from the tape. That signal is applied as an input signal on a lead 156 in FIG. 4. That signal is applied through a buffer gate 158 to the CLEAR input terminal of the flip-flop 144. For signals which are defined as return-to-zero type the signal applied to the input terminal 156 is a logical high. That logical high signal when applied to the CLEAR input terminal of the flip-flop 144 does not change the status of the flip-flop 144. In that condition, the flip-flop 144 and the flip-flop 146 together act as a divide-by-four combination to divide the Q output signal from the divider 142 to produce the signal which has heretofore been defined as the synthesized clock signal. When, however, the signal is of the type identified as non-return-to-zero, a logical low signal is applied to the input lead 156 and thence to the CLEAR terminal of the flip-flop 144. That logical low causes the flip-flop 144 to be locked in a clear state, rendering that flip-flop 144 inoperative. In that condition, the flip-flop 146 acting alone constitutes a divide-by-two circuit. This means that the synthesized clock signal has a frequency which is two times the apparent frequency of the data bit rate. This type of clock signal on the output leads 78 and 79 provides the proper timing in the subsequent circuitry for the handling of the non-return-to-zero type input signal.

As thus far described, it has been assumed that the data signals received from the tape have been nominal in value and that there have been no flaws or drop-outs. That would be indicated by a logical low signal being applied to the input lead 124 which is, in turn, applied through the buffer gate 136 to the D input terminal of the flip-flop 138. As such, not only does the logical high appearing at the $\overline{Q}$ output of the gate 138 enable the flip-flop 134 to transmit the data back to the comparator 153 comprised of the EXCLUSIVE-OR gates 148 and 150 and the flip-flop 152, but that signal also enables the AND gate 158. When the AND gate 158 is enabled, the $\overline{Q}$ output of the divider 142, is gated to an output terminal 80. That signal appearing at the output terminal 80, which is, as noted, of a frequency substantially four times that of the data bit rate signal, is made available and connected to an input terminal of a synchronizer logic circuit associated with an adjacent record channel on the same system, e.g., bit synchronizer 18.

Similarly, the comparable four times data bit rate signal is made available to the present synchronizer logic circuit at the input terminal 76 from an output terminal 80 of a digital synchronizer logic circuit associated with an adjacent channel. That signal applied to the input terminal 76 of the present circuit is applied through a network comprising the gates 160, 162, and 164. As shown connected, these gates comprise a frequency doubler. Accordingly, the output signal from the gate 164 has a frequency which is substantially eight times the nominal data bit rate. That signal is in turn, applied to the clock input terminal of a divider 166. The Q output terminal of the flip-flop 138 is also connected to the reset input of the divider 166.

So long as the Q output is at a logical high, the divider 166 is disabled and all output terminals are locked at a logical low. When, however, the divider 166 is rendered operable, it provides an output signal which is a submultiple of the input signal to the clock input terminal thereof. In the aforementioned exemplary embodiment of the present invention, the module was chosen to divide by sixteen. Therefore the output signal of the divider 166 has a frequency which is substantially one-half of the nominal data bit rate. That output signal is connected in common with the output terminal of the AND gate 134.

If a flaw occurs in the channel being monitored, the first thing that appears is a drop-out of the sequence of data bits on the lead 88. When that occurs, there will be no data bits transmitted by the gate 134 to the comparator 153. Under that situation, the output of the gate 150 remains at whatever its last assigned value should be. Concurrently, the dividers 142, 144, and 148 continue to provide a synthesized data bit clock signal at the output terminals 78 and 79 at whatever the last determined clock rate should have happened to have been. That signal would be adequate to maintain the synchronization of the subsequent data bits, when they are restored, with the timing and clocking circuits of the subsequent structure of the apparatus provided that the velocity of the tape being sensed remains constant. A potential for data bit slip results from variations in the tape speed. Such bit slip would, in the subsequent circuitry, produce a state of confusion for such circuitry as is used to determine frame rate for the display of data corresponding to the recorded signals, for example.

In connection with the discussion of the circuitry shown in FIG. 3, it was observed that a drop-out handover signal, a logical high signal would be developed on the output lead 124 after the flaw or drop-out of signal from the tape had persisted for a count of fifteen bit times. The flywheel effect of the continuation of the operation of the circuitry shown in FIG. 4 to provide the synthesized data bit clock signals by the sequential dividers in the absence of actual data bits, would be sufficient to maintain the synchronous relationship during that sixteen bit interval. At the end of that fifteen bit interval, the appearance of the logical high signal on the lead 124 causes the flip-flop 138 to be triggered by the next synchronous or clock signal from the output of the flip-flop 146 to go to a set condition, leaving a logical low on the $\overline{Q}$ output of the flip-flop 138. The setting of the flip-flop 138 establishes the handover condition for the synthesized data bit synchronizing system. The logical low at the $\overline{Q}$ output disables both the gate 134 and the gate 158. The disabling of the gate 134 prevents any signals which may appear on the data line 88 from being transmitted to the comparator 153. Similarly the disabling of the gate 158 inhibits the four times data bit rate signal on the output terminal 80. On the other hand it enables the divider 166, which then accepts the signal from the input terminal 76 through the frequency doubler and divides that signal to provide the one half times the data bit rate signal to the input of the comparator 153. That signal applied to the comparator 153 then allows the comparator to maintain the synchronous count with the synthesized signal from the adjacent data track.

When the flaw has ceased on the primary data track, the counters 114 and 116 are instantly reset, enabling the counters 120 and 122. As mentioned earlier, the data must be restored on the primary data track for a period of substantially sixty-three data bit periods before the handover signal on the lead 124 is removed. That period is established at the arbitrary value in order to obviate a rapid sequential handover and handback and handover again in the event of multiple flaws on the same primary data track. Once the handover signal from the output of the counter 122 has been removed, the flip-flop 138 will, on the next synchronized clock pulse applied to the input thereof be reset, enabling the gates 134 and 158 and disabling the divider 166. This, in turn, restores the data bit synchronizer to ordinary operation.

Thus there has been provided, in accordance with the present invention, a tape transport speed control system wherein a digital data rate clock signal is synthesized from the data signals on a primary record track of a magnetic recorder playback system, which synthesizing operation is capable of flywheeling during a brief absence of input data signals, and which has a data bit slip prevention arrangement whereby the synthesized data rate clock is temporarily synchronized with data signals from an adjacent data track on the tape record during prolonged signal drop-out intervals on the primary track.

The embodiments of the present invention in which an exclusive property or privilege is claimed are defined as follows:

1. A tape transport speed control system comprising:
   playback means for reading digital data signals recorded on a preselected recording track of a recording medium,
   means for driving the recording medium past said playback means;
   means for synthesizing digital clock signals representative of the speed of the recording medium during the recording of the digital data signals from said digital data signals;
   means for producing a digital signal representative of the speed of the recording medium during the playback of said digital data signals, and
   speed control means responsive said digital signal from said means for producing and said digital clock signal from said means for synthesizing to produce a control signal for said means for driving to maintain the speed of the recording medium at the speed used during the recording of said digital data signals.

2. A tape transport control system as set forth in claim 1 wherein said means for synthesizing a digital clock signal from said digital data signals includes:
   a source of reference clock signals having a frequency higher than the desired synthesized clock signals;
   means for deriving digital clock signals from said reference clock signals of a frequency commensurate with said desired synthesized clock signals; and means for synchronizing the derived clock signals with said digital data signals to produce said synthesized digital clock signals.

3. A tape transport speed control system as set forth in claim 2 wherein said means for deriving digital clock signals includes a frequency divider means connected to receive said reference clock signals to provide a frequency divided signal.

4. A tape transport speed control system as set forth in claim 3 wherein said divider means comprises a signal controlled variable divider and wherein said means for synchronizing includes a phase comparator means connected to compare the phase of said frequency divided signal with said digital data signal to provide a control signal to control the division rate of said variable divider.

5. A tape transport speed control system as set forth in claim 4 wherein said playback means comprises a reproducer system for digital data magnetic records and said digital data signals comprise digital data signals transduced from one data track of a multiple-track magnetic record.

6. A tape transport speed control system as set forth in claim 5 wherein said divider means comprises a first divider stage means for producing a first signal having a frequency of a first submultiple of said reference clock signal, synchronized to said digital data signals and subsequent divider stage means to produce said derived clock signals, and
    means connected to said first divider stage means for providing an output signal commensurate with said first signal.

7. A tape transport speed control system as set forth in claim 6 and further including drop-out detecting means connected to detect a drop-out condition of said digital data signals transduced from said one track of said multiple track magnetic record, and means for producing a drop-out signal indicative of said drop-out condition.

8. A tape transport speed control system as set forth in claim 7 and including substantially identical digital clock synthesizing means for a second data track of said multiple-track magnetic record and including, in each synthesizing means, gating means connected to be operable in response to said drop-out signal to borrow synchronizing signals from another data track of said multiple-track record, whereby to maintain the synchronism of said synthesized digital clock signals with digital data signals during a drop-out signal interval, said gating means being further operable to restore the affected synthesizing means to internal synchronization after the cessation of said drop-out signal.

9. A tape transport speed control system as set forth in claim 7 wherein said drop-out detecting means includes threshold detector means comprising comparator means for comparing input digital data signals with a predetermined threshold signal level for producing output pulse signals at each zero-crossing of said digital data input signals so long as said digital data input signals exceed said threshold signal level; first delay means responsive to said threshold detector output for producing said drop-out signal a predetermined time after the cessation of said output pulse signals, and second delay means for terminating said drop-out signal a predetermined time after restoration of said pulse signals.

10. A tape transport speed control system as set forth in claim 8 wherein said gating means is operable to connect the internal synthesizing means to said output signal commensurate with said first signal of an adjacent track of said multiple-track magnetic record, and further including means for deriving a synchronizing signal for the internal synthesizing means from said signal from said adjacent track.

11. A tape transport speed control system as set forth in claim 10 wherein said gating means is further effective to inhibit said output signal commensurate with said first signal during a drop-out interval.

12. A tape transport speed control system as set forth in claim 11 wherein said gating means if effective, during said drop-out interval, to inhibit the application of signals from the affected digital data track to said phase comparator and to substitute therefore the synchronizing signal derived from said signal from said adjacent track.

13. A tape transport speed system as set forth in claim 12 wherein said reference clock signals have a frequency substantially twenty-two times the nominal data bit rate of the digital data signals, and wherein said first signal has a frequency substantially four times the frequency of said nominal data bit rate.

14. A tape transport speed control system as set forth in claim 8 and further including second drop-out detecting means connected to detect a drop-out condition of said digital data signals transduced from said second track of said multiple track magnetic record, second means for producing a second drop-out signal indicative of said drop-out condition and means responsive to said drop-out signals indicative of said drop-out condition in said one track and said second track to produce a control signal upon the detection of a concurrent presence of said drop-out signals and means responsive to said control signal to substitute a constant frequency signal for said digital clock signal from said means for synthesizing during the occurrence of said concurrent presence of said drop-out signals.

* * * * *